United States Patent Office 3,508,925
Patented Apr. 28, 1970

3,508,925
METHOD FOR PREPARING GELATINO EMULSIONS CONTAINING LATEXES AND POLYVALENT SALTS AND PRODUCTS OBTAINED THEREBY
Thomas E. Whiteley and Charles A. Goffe, Rochester, N.Y., assignors to Eastman Kodak Company, Rochester, N.Y., a corporation of New Jersey
No Drawing. Filed Sept. 8, 1967, Ser. No. 666,472
Int. Cl. G03c 1/08
U.S. Cl. 96—114.7               16 Claims

ABSTRACT OF THE DISCLOSURE

Methods for preparing stable gelatino emulsions containing latex polymers and polyvalent salts and emulsions produced thereby. In one aspect, this invention relates to a method for (1) initially mixing a gelatino solution and a latex polymer which comprises no more than about 24%, by weight, of units of a water solubilizing moiety and (2) then adding polyvalent salts to the mixture.

---

This invention relates to gelatino emulsions and the preparation thereof. In one aspect, this invention relates to a method for preparing stable gelatino emulsions containing latex polymers and polyvalent metal salts. In another aspect, this invention relates to emulsions which comprise gelatin, a latex polymer and polyvalent metal salts wherein said emulsion is substantially free of coagulation of the latex polymer.

It is desirable to add polyvalent metal ions to photographic compositions to improve photographic properties therein; many polyvalent metal ions act as stabilizers, fog inhibiting agents, sensitizers and the like. It is also desirable to add latex polymers to photographic emulsions as a replacement for part of the gelatin to improve dimensional stability, lower the water retention of the emulsion, etc. In practice, the latex polymers are generally added just prior to coating after all other addenda has been incorporated into the emulsion. However, when latex polymers are added to emulsions containing polyvalent metal salts, the latex polymer generally coagulates resulting in an emulsion which cannot be coated by conventional techniques. Moreover, the improved properties generally associated with an emulsion layer containing uncoagulated latex polymer generally disappear when the latex polymer coagulates in the emulsion layer.

Therefore, it is an object to provide a stable emulsion containing gelatin, a latex polymer and polyvalent metal salts.

It is another object to provide a means for producing a stable emulsion containing gelatin, a latex polymer and polyvalent metal salts.

It is another object to provide an emulsion containing latex polymers and polyvalent metal salts which can be coated by conventional techniques.

It is another object to provide a photographic element having an emulsion layer containing a substantially uncoagulated latex polymer, gelatin and polyvalent metal salts.

These and other objects of the invention are accomplished by a method of combining the separate components of the emulsion in a given order to reduce the coagulation of the latex polymer. In a typical embodiment of the invention, a gelatino solution and a latex polymer having carboxy groups thereon are thoroughly mixed together. The polyvalent metal salts are then added to the emulsion. The resultant emulsion is relatively stable and is substantially free of coagulated latex polymer. In a preferred embodiment, an emulsion is made in this manner and is then coated on a support by conventional techniques.

However, the gelatin-latex polymer emulsion can be coated onto a support and the polyvalent salt coated in a separate layer to achieve an emulsion layer containing a latex polymer and polyvalent metal salts as the polyvalent metal salts can migrate into the layer containing the latex polymer.

The polyvalent metal salts which can be employed in the invention are the inorganic acid salts of cadmium, cobalt, manganese, zinc, rhodium, iridium, platium and the like. Typical anions for the respective salts include chlorides, bromides, nitrates, sulfates and the like. Typical examples of salts which are useful to improve the photographic properties of photographic emulsions include cadmium chloride, cadmium nitrate, cobalt nitrate, manganese chloride, manganese sulfate, zinc chloride, zinc nitrate, zinc sulfate, bismuth trinitrate pentahydrate, ammonium chlororhodate, dihydrogen hexachloroplatinate and the like.

The latex polymers which can be used according to this invention are generally water insoluble, i.e. they are relatively insoluble in water and form a latex emulsion rather than a solution with water even at low polymer concentrations in the water. However, the latex polymers of the invention do contain at least one water solubilizing group such as acrylic acid, sulfoester acrylates and the like, but they are present in limited amounts such as to maintain the latex characteristic of the polymer. In a preferred embodiment of this invention, the solubilizing group is a carboxy group. The units containing the solubilizing groups generally comprise no more than 24%, by weight, of the polymer and preferably from 5 to 15%, by weight, of the interpolymer.

Typical latex polymers which can be used according to this invention are acrylic interpolymers, i.e. those interpolymers prepared from polymerizable acrylic monomers containing the characteristic acrylic group

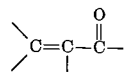

Such polymers are conveniently prepared by the interpolymerization of an acrylic monomer with at least one dissimilar monomer which can be another acrylic monomer or some other different polymerizable ethylenically unsaturated monomer such as, for example, ethylene, propylene, butylene, etc.

In one embodiment, interpolymers which can be used in this invention comprise units of an alkyl acrylate such as, for example, methyl acrylate, ethyl acrylate, propyl acrylate, butyl acrylates (e.g. n-butyl or t-butyl acrylates), amyl acrylates, hexyl acrylates and the like. The acrylic interpolymers contain units of a sulfoester acrylate and preferably units containing carboxy groups are useful in the process. Typical polymers of this type are copoly-(methyl acrylate-acrylic acid), copoly(ethyl acrylate-acrylic acid), copoly(butyl acrylate-sulfopropyl acrylate) and the like and preferably copoly(butyl acrylate-acrylic acid).

The method of obtaining emulsions containing latex polymers and polyvalent salts is especially useful when making silver halide emulsions. In a preferred embodiment, the silver halide is prepared in a gelatino media. The latex polymer is then mixed thoroughly with the silver halide, gelatino emulsion and subsequent thereto the polyvalent metal salts are added to the emulsion. The silver halide employed in the emulsion may be silver bromide, silver chloride, silver chloroiodide, silver chlorobromide, silver chlorobromoiodide and the like.

In another embodiment, the silver halide, gelatino emulsion can be mixed with the latex polymer and then coated on a support. The polyvalent metal salt can then be coated on the emulsion layer to permeate the emulsion layer with said salts. Silver halide emulsion layers coated by this technique exhibit increased photographic properties such as fog reduction, improved contrast and increased speed.

This invention can be further illustrated by the following examples of preferred embodiments thereof although it will be understood that these examples are included merely for purposes of illustration and are not intended to limit the scope of the invention unless otherwise specifically indicated.

EXAMPLE 1

Forty grams of a 10% aqueous gelatin solution is mixed with 46 grams of an 8.8% aqueous solution of copoly(ethyl acrylate-acrylic acid) (20% acrylic acid by weight). One milliliter of 15% aqueous saponin and 13 ml. of distilled water containing 0.48 g. $Zn(NO_3)_2$ are then added. There is no coagulation; the mixture is coated on a cellulose acetate support by conventional techniques resulting in a clear, smooth coating.

A control sample containing no zinc nitrate is also coated on a cellulose acetate support resulting in a clear smooth coating.

Emulsion containing cadmium chloride, cadmium nitrate, cobalt nitrate, manganese chloride, manganese sulfate, zinc chloride, bismuth trinitrate pentahydrate, ammonium chlororhodate and dihydrogen hexachloroplatinate respectively result in clear smooth coatings exhibiting substantially no coagulation when coated on a cellulose acetate support.

EXAMPLE 2

Forty grams of a 10% aqueous gelatin solution is mixed thoroughly with 20 grams of a 20% latex emulsion of copoly(butyl acrylate-acrylic acid) (10% acrylic acid). One milliliter of 15% aqueous saponin and 39 ml. of distilled water containing 0.566 gr. of $CdCl_2$ is added slowly to the emulsion. There is no coagulation and the mixture is coated on a cellulose acetate support resulting in a clear smooth coating.

Similar results are obtained when the latex polymers of copoly(butyl acrylate-sulfopropyl acrylate) and copoly (ethylacrylate-sulfopropyl acrylate) are incorporated in the emulsion.

EXAMPLE 3

An emulsion is prepared according to Example 2 except 0.489 of $Zn(NO_3)_2$ is present in the distilled water. There is no coagulation and the mixture is coated on a poly(ethylene terephthalate) support resulting in a smooth clear coating.

An emulsion is made adding the $Zn(NO_3)_2$ to the gelatin solution and then adding the solution of copoly (butyl acrylate-acrylic acid) to the gelatino mixture. Severe coagulation quickly occurs and the mixture cannot be coated to a smooth even coating.

EXAMPLE 4

The gelatin-latex acrylic interpolymer mixture can be first coated on a support and then coated with the polyvalent salt to achieve a stable coating with substantially no coagulation of the latex polymer. Photographic properties of a silver halide gelatino-latex acrylic interpolymer emulsion can be improved by this procedure. A high contrast "lith type" silver chlorobromide emulsion containing 107 gr. of gelatin per mole of silver and 54 millimoles of cadmium chloride per silver mole is coated at a coverage of 412 mg. Ag/ft.$^2$ and 408 mg. gelatin per square foot. An antiabrasion layer is then coated over the emulsion layer at 50 mg. gelatin per square foot. This sample served as a control.

A second sample (No. 2) identical silver chlorobromide emulsion containing 40 gr. of gelatin per silver mole and 80 gr. of copoly(butyl acrylate-acrylic acid) (10% acrylic acid by weight) is coated at a coverage of 412 mg. of silver/ft.$^2$. The cadmium chloride is not present in the emulsion. An antiabrasion layer (as above) is coated on this sample.

A third sample (No. 3) is prepared similar to the next above sample except the antiabrasion layer contains sufficient cadmium chloride to provide 54 millimoles per silver mole in the adjacent layer.

The samples are then exposed on an Eastman Ib Sensitometer, developed for 2¾ minutes in a paraformaldehyde developer (Kodak D–85), fixed, washed and dried. The tests are repeated with samples kept for one week at 120° F. and 50% relative humidity.

|  | Fresh | | | 1 week incubation | | |
| --- | --- | --- | --- | --- | --- | --- |
|  | Rel. speed | γ | Fog | Rel. speed | γ | Fog |
| Sample: | | | | | | |
| Control | 132 | 4.5 | .04 | 159 | 5.10 | .04 |
| No. 2 | 100 | 3.7 | .04 | 209 | 4.5 | .20 |
| No. 3 | 209 | 4.5 | .04 | 276 | 4.9 | .05 |

A distinct gain in fog reduction, improved contrast and speed gain are obtained in emulsion layers by this coating technique. While the addition of latex acrylic interpolymers to metal ion containing emulsions results in coagulation of the polymer, metal ion salt addition to the overcoat causes no sign of coagulation in the latex polymer-containing emulsion layer.

The invention has been described in detail with particular reference to preferred embodiments thereof, but it will be understood that variations and modifications can be effected within the spirit and scope of the invention.

We claim:

1. A method for preparing a gelatino emulsion containing (a) an acrylic latex polymer comprising no more than about 24 percent, by weight, of units containing thereon a water-solubilizing moiety and (b) inorganic acid salts of polyvalent metals wherein said process comprises (1) initially mixing a gelatin solution and said latex polymer and (2) then adding said polyvalent inorganic acid salts of polyvalent metals to said mixture.

2. A method according to claim 1 wherein said acrylic polymer comprises units selected from the group consisting of alkyl acrylates, acrylic acid and sulfoester acrylates.

3. A method according to claim 1 wherein said inorganic acid salts are salts of cadmium, cobalt, manganese, zinc, rhodium, iridium, platinum or mixtures thereof.

4. A method according to claim 1 wherein said inorganic acid salt is an inorganic water-soluble acid salt of cadmium.

5. A method according to claim 1 wherein said acrylic polymer is copoly(butyl acrylate-acrylic acid).

6. A method according to claim 1 wherein the gelatino-latex polymer mixture is coated on a support before the polyvalent salts are added to the mixture.

7. A method for making a photographic element wherein a gelatino emulsion is initially prepared according to claim 1 and then coated onto a support.

8. A method for making a photographic element comprising (1) mixing a silver halide gelatin emulsion and an acrylic latex polymer which contains no more than about 24 percent, by weight, of units having a water-solubilizing group thereon, (2) coating the gelatin-latex polymer emulsion on a support and (3) coating a water-soluble inorganic acid salt of a polyvalent metal in a layer adjacent said gelatin-latex polymer emulsion.

9. An emulsion comprising gelatin, a latex acrylic interpolymer which comprises no more than about 24 percent, by weight, of units having a water-solubilizing group thereon, and inorganic acid salts of polyvalent metals said emulsion being substantially free of coagulation.

10. The emulsion of claim 9 wherein said acrylic interpolymer comprises units of an alkyl acrylate.

11. The emulsion of claim 9 wherein said acrylic interpolymer is copoly(butyl acrylate-acrylic acid).

12. An element comprising a support and an emulsion layer, said emulsion comprising gelatin, a latex acrylic interpolymer which comprises no more than about 24 percent, by weight, of units having a water-solubilizing group thereon, and a water-soluble inorganic acid salt of a polyvalent metal.

13. An emulsion comprising gelatin, an acrylic latex copolymer comprising no more than 24 percent, by weight, of units having a carboxy group thereon, and an inorganic acid salt of a polyvalent metal said emulsion being substantially free of coagulation.

14. An emulsion according to claim 13 wherein said interpolymer comprises from about 5 to about 15%, by weight, units of acrylic acid.

15. A method according to claim 1 wherein said gelatino emulsion comprises a silver halide.

16. An emulsion according to claim 9 which comprises a silver halide.

References Cited

UNITED STATES PATENTS

| | | | |
|---|---|---|---|
| 2,059,642 | 11/1936 | Kankelwitz | 96—110 |
| 2,448,857 | 9/1948 | Brice | 96—110 |
| 2,552,230 | 5/1951 | Stauffer et al. | 96—110 |
| 2,566,263 | 8/1951 | Trivelli et al. | 96—110 |
| 2,839,405 | 6/1958 | Jones | 96—110 |
| 3,062,674 | 11/1962 | Houck et al. | 96—114 |
| 3,220,844 | 11/1965 | Houck et al. | 96—114 |
| 2,953,455 | 9/1960 | Maffet | 96—110 |

WILLIAM H. SHORT, Primary Examiner

E. WOODBERRY, Assistant Examiner

U.S. Cl. X.R.

96—108, 110; 260—8